(12) United States Patent
Boveja et al.

(10) Patent No.: US 6,696,928 B1
(45) Date of Patent: Feb. 24, 2004

(54) METHOD AND SYSTEM FOR COUNTERING HOSTILE ACTIVITY ABOARD AN AIRPLANE

(76) Inventors: Birinder R. Boveja, P.O. Box 210095, Milwaukee, WI (US) 53221; Angely Widhany, P.O. Box 210095, Milwaukee, WI (US) 53221

( * ) Notice: Subject to any disclaimer, the term of this patent is extended or adjusted under 35 U.S.C. 154(b) by 77 days.

(21) Appl. No.: 10/007,283

(22) Filed: Oct. 22, 2001

(51) Int. Cl.[7] .......................... B60R 25/10; G08B 21/00
(52) U.S. Cl. .............................. 340/426.12; 340/425.5; 340/945; 340/426.11; 340/825.69; 340/825.72; 701/3; 244/1 R
(58) Field of Search ................ 340/425.5, 426, 340/945, 825.69, 426.11, 426.12, 825.72; 244/1 R; 701/3

(56) References Cited

U.S. PATENT DOCUMENTS

| | | | | |
|---|---|---|---|---|
| 3,658,277 A | * | 4/1972 | Anderson | 244/119 |
| 3,680,499 A | * | 8/1972 | Boudreau | 109/32 |
| 4,062,303 A | | 12/1977 | Fegley | 109/20 |
| 4,644,845 A | * | 2/1987 | Garehime, Jr. | 358/108 |
| 4,841,752 A | | 6/1989 | Fletcher | 109/20 |
| 5,182,541 A | | 1/1993 | Bajorek et al. | 340/428 |
| 5,311,166 A | * | 5/1994 | Frye | 340/541 |
| 5,318,147 A | * | 6/1994 | Maiefski | 180/287 |
| 5,402,000 A | * | 3/1995 | Owens, II | 340/545 |
| 5,424,712 A | * | 6/1995 | Rosenberger | 340/426 |
| 5,655,461 A | | 8/1997 | Gilbert | 109/20 |
| 5,685,636 A | * | 11/1997 | German | 362/259 |
| 5,703,563 A | | 12/1997 | Abe, Jr. | 340/428 |
| 5,796,330 A | | 8/1998 | Vinette | 340/426 |
| 5,803,359 A | | 9/1998 | Vandoninck | 239/2.1 |

* cited by examiner

*Primary Examiner*—Donnie L. Crosland

(57) ABSTRACT

A method of countering terrorism or hostile activity in an airplane by using a built-in defense system within the aircraft. The defense system includes chemical sprays, laser guns, and pre-programmed sound alarm systems. The aerosol chemicals range from benign fogging agents to non-lethal incapacitating agents from the categories of inhalants, general anesthetics, and irritants. Any of the systems can be used singly or in any combination. These systems can be activated manually from the control panel in the cockpit, or via a remote wireless system by the flight crew from anywhere within the plane. Such activation being password and code protected.

26 Claims, 11 Drawing Sheets

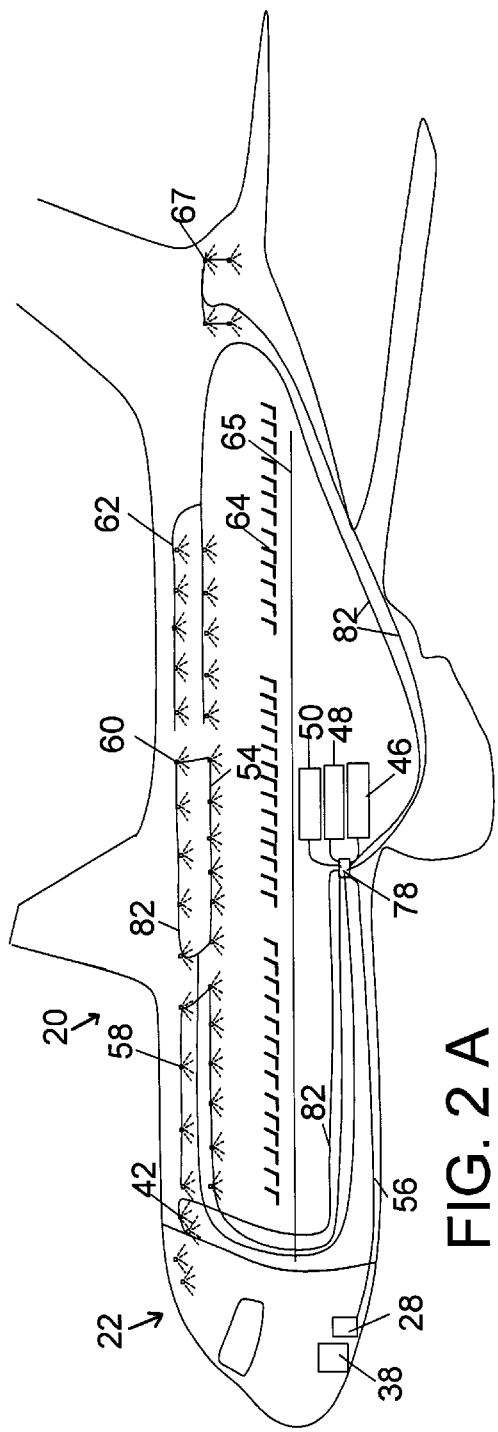
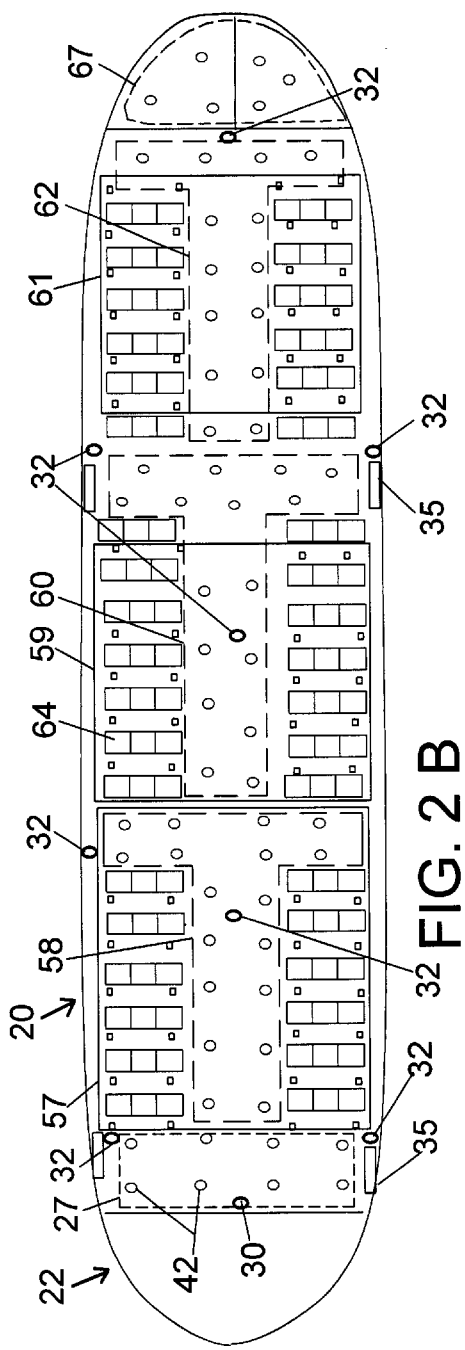
FIG. 2A
FIG. 2B

METHOD AND SYSTEM FOR COUNTERING HOSTILE ACTIVITY ABOARD AN AIRPLANE

FIELD OF INVENTION

This invention relates generally to anti-hijacking system, more specifically to method and system for countering hijacking attempts aboard an airplane by activating chemical spray systems, laser guns, and alarm system incorporated within the airplane.

This application is related to a co-pending application filed on Oct. 22, 2001, entitled WIRELESS REMOTE CONTROL OF SYSTEMS FOR COUNTERING HOSTILE ACTIVITY ABOARD AN AIRPLANE.

BACKROUND

Airline security measures have been applied to a large extent at the ground level. Some of the tools that have been used are to have the passengers pass through metal detectors, carry-on baggage being screened via x-ray equipment, and random checks on selected baggage for analysis of trace chemicals. The events which occurred in the United States, on Sep. 11, 2001 namely the hijackers taking control of the aircraft and purposely slamming the airliners into World Trade Towers and the Pentagon, obviate the need for more drastic defense measures aboard the commercial airliners. This patent application is directed to method and system for countering/foiling hostile activity aboard an airplane and is intended to be used in conjunction with other security and defense methods already in use, such as having plain clothes security marshals aboard the airliners.

Prior art is generally directed to robbery deterrent systems or anti-carjacking devices. U.S. Pat. No. 5,655,461 (Gilbert) is directed to robbery deterrent system for convenience stores. In the system of the Gilbert patent, aerosol incapacitating agent is delivered immediately upon the detection of a firearm discharge, or in response to an employee activated trigger.

U.S. Pat. No. 4,062,303 (Fegely) is directed to anti-burglar booby trap device. In the Fegly patent, a pressurized container is moveably mounted in the anti-burglar device between an actuatable position and an inactuatable position. When the pressurized container is in the actuatable position, opening a door or a window will cause the device to discharge fluid from the pressurized container. In the inactuatable position, the anti-burglar device will permit the door or window to be opened without causing the device to discharge.

U.S. Pat. No. 5,803,359 (Vandoninck) is directed to a device for generating fog.

U.S. Pat. No. 4,841,752 (Fletcher) is directed to robbery deterrent apparatus. In the Fletcher patent, a plurality of nozzles dispense a disabling fluid chemical upon activation of a control valve by the foot pedal and cash register positioned switch.

U.S. Pat. No. 5,703,563 (Abe Jr.) is directed to an anti-hijack system for an automobile. In the Abe Jr. patent, spray nozzles are in the window well of the front windshield of a car in such a manner that the spray impinges upon a person outside the vehicle and in vicinity of the driver's door.

U.S. Pat. No. 5,182,541 (Bajorek) is directed to a remote controlled theft deterrent system.

SUMMARY OF INVENTION

The prior art directed to robbery deterrent systems and anti car-jacking devices is not well adapted to anti-terrorist activities aboard an airplane. Accordingly, this invention is directed to method and system for countering hijacking attempts by activating chemical spray systems, fogging systems, laser guns, alarm systems, and means of activating them. The method and system of this patent application comprises different modalities which can be used to complement each other in debilitating or rendering the perpetrators non-functional.

In one aspect of the invention, chemically inert agents such as fog producing agents are stored in pressurized cylinders aboard the airliner. Under the appropriate situation, a member of the flight crew can activate a system whereby fog is quickly released into cabin for disrupting the hijackers. A sound alarm system can also be activated with fog release in order to disrupt the activities of the hijackers.

In another aspect of the invention, the spraying action for fog and chemicals is divided into sections so as to activate an individual section or combined areas in the passenger compartment, depending on the situation.

In another aspect of the invention, non-lethal incapacitating chemical agents which affect the central nervous system (CNS), such as inhalants, general anesthetics, and irritants may be selectively released by the appropriate flight crew into the cabin, for disrupting hijacking attempt.

In another aspect of the invention, laser guns which are strategically pointed behind the cockpit door (and other areas in the cabin), can be selectively used by appropriate personnel and under appropriate conditions.

These systems can be activated from the control panel within the cockpit, or from anywhere within the plane via a wireless transmitter. Therefore, in another aspect of the invention, a customized wireless transmitter sends encoded radiofrequency signals for communication and activation of any single or combination of anti-hijacking modalities, described in this patent application.

In successfully defending against a terrorist attack it is imperative that multiple modalities are available to the defending team to choose from, and that these modalities can function selectively, or simultaneously, or sequentially. For example, fogging can be used with laser guns, or spraying aerosol chemicals and fogging can be used in combination. As each hostile situation is different in intensity and terrorist's abilities, an adequate defense system requires surprise element and flexibility of operation.

BRIEF DESCRIPTION OF THE DRAWINGS

For the purpose of illustrating the invention, there are shown in the accompanying drawings forms which are presently preferred; it being understood that the invention is not intended to be limited to the precise arrangements and instrumentalities shown.

FIG. 2A is a schematic diagram of an airplane showing spray nozzles and cylinders.

FIG. 2B is a schematic diagram (top-view) of an airplane showing location of spray nozzles.

DESCRIPTION OF THE INVENTION

The current invention describes a method and system for foiling/countering hostile attempts with various modalities, ranging from simple alarm sounding systems, to the more complex various types of chemical spray system built into the aircraft, and laser guns outside the cockpit door. Any of the modalities described in this patent application may be used by itself or in any combination. Any of these systems may also be activated in any combination, by a small, easy to carry, customized wireless activation transmitter system.

For practicing the method and system of this invention, under extremely serious situations such as hostile activity aboard the aircraft, an appropriate person from the flight crew is able to activate a system, where upon pressing an appropriate button from the cockpit is able to activate one of the anti-hijacking defense systems.

Figure 1:
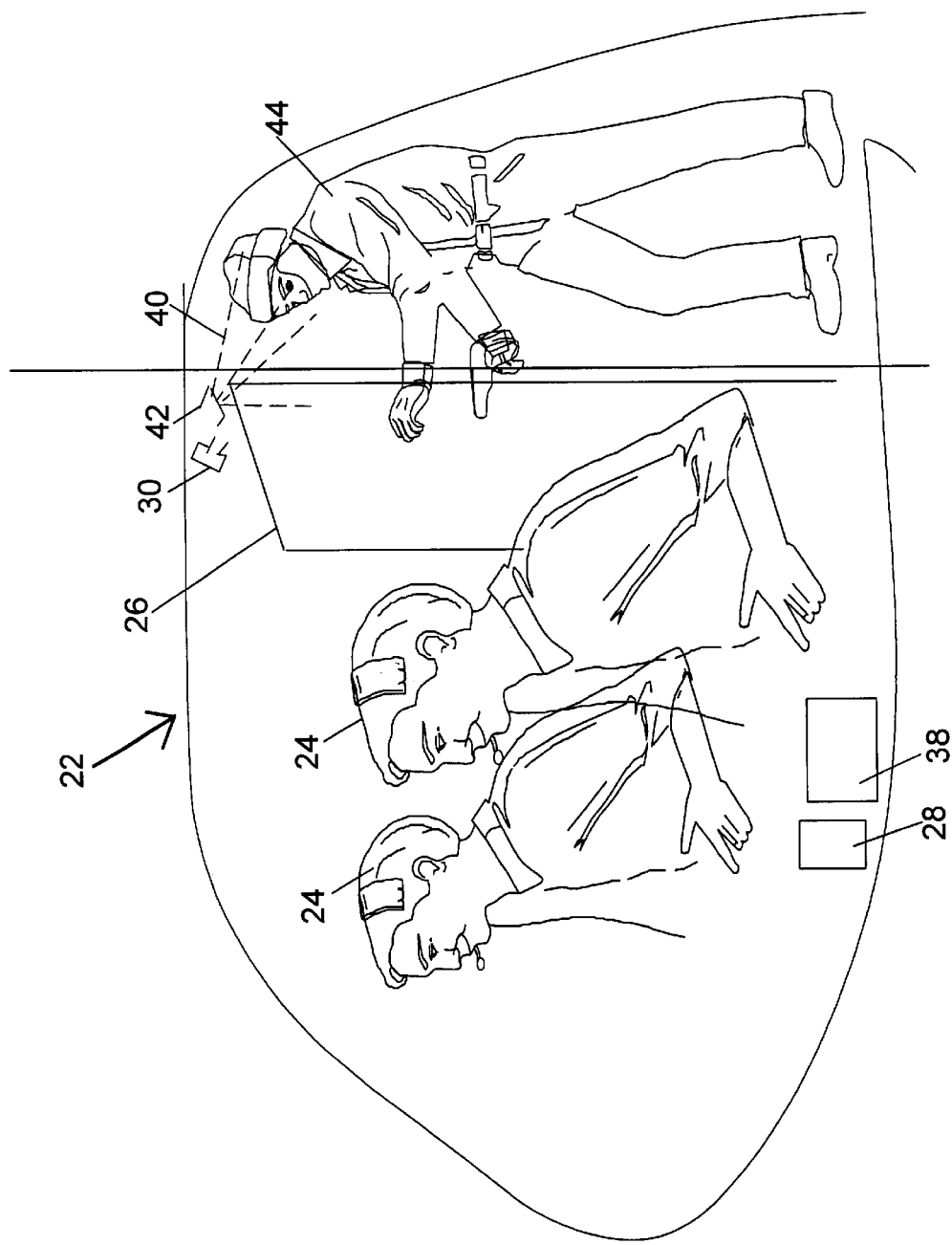
FIG. 1 is a schematic diagram showing fight crew in the cockpit and hijacker outside the cockpit door.

As shown schematically in FIG. 1, in one embodiment of practicing this invention, cameras 30 are located strategically outside the cockpit door (and other cameras 32 in the cabin) enable the cockpit crew 24 to have a view of the passenger cabin area 20. Upon sensing danger, the pilot 24 or another member of the cockpit crew 24, can quickly look into the cabin from the monitor 38 by zooming onto the appropriate camera from the control panel 28, to get a look at the target individuals. If deemed appropriate by the captain, individuals from the flight crew are able to put on the gas masks, and turn "on" the chemical spray from the spray nozzle(s) 42.

As shown in FIGS. 2A and 2B, the spray outlet nozzles are strategically located overhead behind the cockpit door area 27 and in the cabin 20. For the purposes of dispensing the chemicals, the spray nozzles are broken down into sections, such that the chemicals can be dispensed to selected areas of the plane independently. Therefore with the aid of the cameras, a captain (or crew member) may activate only the area behind the cockpit door 27, or one or multiple sections of the cabin 20, without leaving the cockpit. Upon activation, the camera images can also be recorded on the airplane's flight recorder and/or the "black box".

Since the aim is to temporarily render the hijackers non-functional or dysfunctional, various choices of aerosol chemicals spray, from very benign to very potent chemical are available. Four broad categories of aerosol chemicals can be used for practicing the methods of this invention. The most benign category is smoke or fogging agents, which work by visually blocking an area or sections of the airplane. Other more potent categories are inhalants, general anesthetics, and irritants.

Inhalants, which include a wide variety of breathable chemicals produce mind-altering results. Effects of inhalants varies from one substance to another. One advantage of inhalants is that their effects are felt virtually immediately. The duration of effects depends on the substance used. Effects can last from just a few seconds for some, and up to several hours for others. Persons under the influence of inhalants will get confused and disoriented, and their speech will get slurred.

Low doses of gaseous anesthetic agents may also be used singly, or in combination. The effects of these agents are well understood because of their use in medicine and surgery. Commonly used inhaled anesthetic agents are nitrous oxide (also known as laughing gas), halothane, sevoflurane, desflurane, and isoflurane. Halothane and sevoflurane are the easiest to inhale. Nitrous oxide has the advantage that when used alone is not potent enough to be a complete general anesthetic. When the anesthetic gas is inhaled into the lungs, the blood that travels through the lungs carries the anesthetic gas to the central nervous system. The rate at which the bloodstream takes up the anesthetic is dependent on may factors including the concentration of the inspired gas, the rate of flow of the gas, the solubility of the gas in blood, the rate and depth of breathing, and the amount blood the heart pumps each minute.

Among the anesthetic agents, halothane (chemical name 2-bromo-2-chloro-1, 1, 1-trifluroethane) $C_2HBrClF_3$, is a colorless, mobile fluid, and has chloroform odor and a sweet taste. Sevoflurane with chemical name fluromethyl-2, 2, 2-trifuluoro-1-(trifluromethyl) ethyl ether has the chemical formula of, $C_4H_3F_7O$. Nitrous oxide (chemical formula $N_2O$) for example, is a colorless gas, having a sweetish taste and a pleasant odor and is normally used as a general anesthetic or analgesic agent.

In the irritants category, a host of non-lethal chemicals such as mace, pepper sprays, and tear gases can be used. These agents have extensive experience from crime prevention and crowd control during civil disturbances.

The intent of any such aerosol chemical used would be to temporarily debilitate and render the individuals non-functional who come in contact with such chemicals, without causing permanent or long lasting damage. Therefore the concentration, dose, flow rate, and time of spray would have to factored.

An example of tear gas is a compound known as CS, chemical name Orthochlorobenzylidenemalononitrile $ClC_6H_4CHCCN (CN)_2$. It is a blue colored synthetic agent which has the state of micro-particulate solid and is classified as irritant, lacrimator, sternutator. It produces irritation of the skin, tearing and lacrimation, sneezing, and irritation of the respiratory system. It takes effect in about 3 to 10 seconds, and recovery takes about 10 minutes. Since it is made of solid particles, it must be carried through the air by an agent or expelled in a fine dust. Its odor is rather pungent. CS is most irritating in a humid climate and on a moist skin surface. Anyone who has lost his sense of feeling because of the influence of narcotics or alcohol will not be affected by CS. Other pepper sprays with various concentration of Capasicin (the active ingredient) can also be used.

Yet another non-lethal agent being developed at the Sandia National Laboratory in Alburquerque, N.Mex., known as sticky foam can be used. This foam is so sticky that it can literally stop a suspect in his tracks.

The benign gaseous agents which mearly fog up vision, can be used alone or in conjunction with other deterrents such as burglar alarm type of modalities.

The aerosol content supply of chemicals are appropriately pressurized in cylinders and stored in convenient locations aboard the airplane. The control panel of such a system being located in an appropriate place within the cockpit. The pilot or a member of the flight crew is also able to engage the control panel from anywhere within the aircraft using a wireless transmitter as described later in this application.

As shown in FIG. 2A, cylinders 46, 48, 50 containing the aerosol chemicals are stored in an appropriate location within the airplane. Upon activation from the control panel 28 or wireless transmitter 100, regulator valves allow the gas, or combination of gases to flow via tubes to the pumping system 66 and then to the spray nozzles 42, 57, 58, 59, 60, 61, 62, 67 located throughout the airplane.

As shown in FIG. 2B (top view) the spraying action in the airplane is divided into sections, for example front 58, 57, middle 60, 61, or back 62, 61.

Further, sections are divided into aisle and standing areas 42, 57, 59, 61, and 67. The purpose of sectional divisions is to be able to selectively spray, if possible, only the areas of hostile activity. However, if the whole airplane needs to be fogged or chemically sprayed, that can also be done. Another example is that fogging can be done in the whole plane, with the irritant spray only in areas of terrorist concentration. Each section can be activated alone, or simultaneously with other sections, and/or sequentially. Camera (s) 30 and 32 are located outside the cockpit door area 27 and in the cabin passenger areas, respectively. The views from these cameras can be viewed by the cockpit crew on the monitor 38 and help in the selective activation of the modalities.

Figure 3:
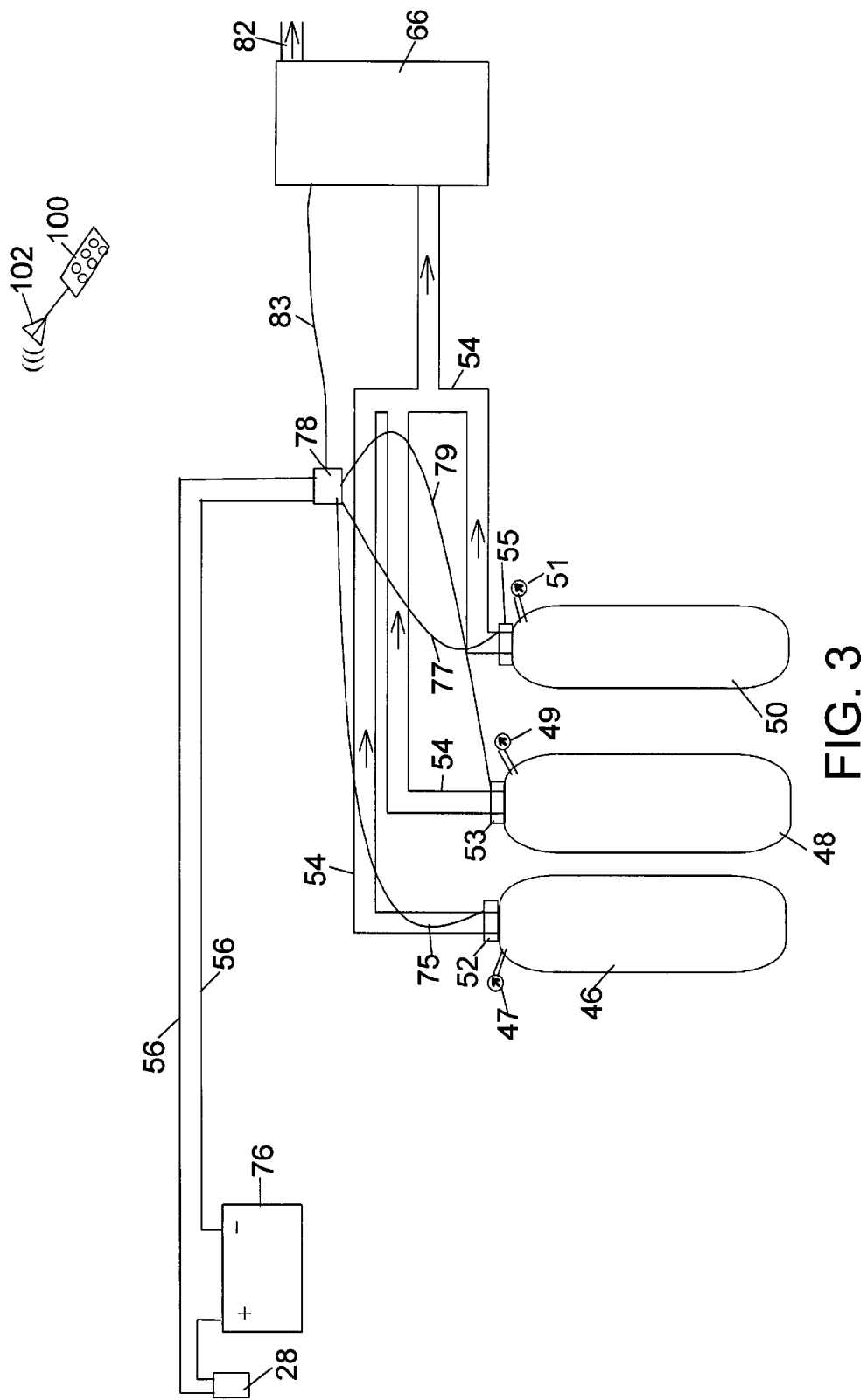
FIG. 3 is a schematic diagram showing the storage and delivery system of the chemicals.

As shown in FIG. 3, the non-lethal incapacitating agents are stored in pressurized containers 46, 48, 50 and are prevented from discharging by solenoid valves 52, 53, 55. Connected to the fluid output of solenoid valves 52, 53, 55 are distribution manifolds 54, which is in communication with discharge manifolds 82. Once solenoid valves 52, 53, 55 are opened, either from the control panel 28 in the cockpit 22 or from the wireless transmitter 100, appropriate chemical agents fill discharge manifolds 82 via distribution manifolds 54 and are dispersed in a predetermined pattern through nozzles distributed within the plane, to effect the individuals standing inside the region defined by the predetermined pattern. The regulation of quantity (flow rate x time) is at the level of control valves 52, 53, 55 from the cylinders 46, 48, 50. The pressure of flow is controlled via pump 66

Pressure monitoring devices 47, 49, 51 (comprising solid-state pressure sensor) monitor pressure in the containers 46, 48, 50. In the event, the pressure in any of the containers 46, 48, 50, goes out of range, appropriate indicators will be lighted on the control panel 28 in the cockpit.

Figure 4:
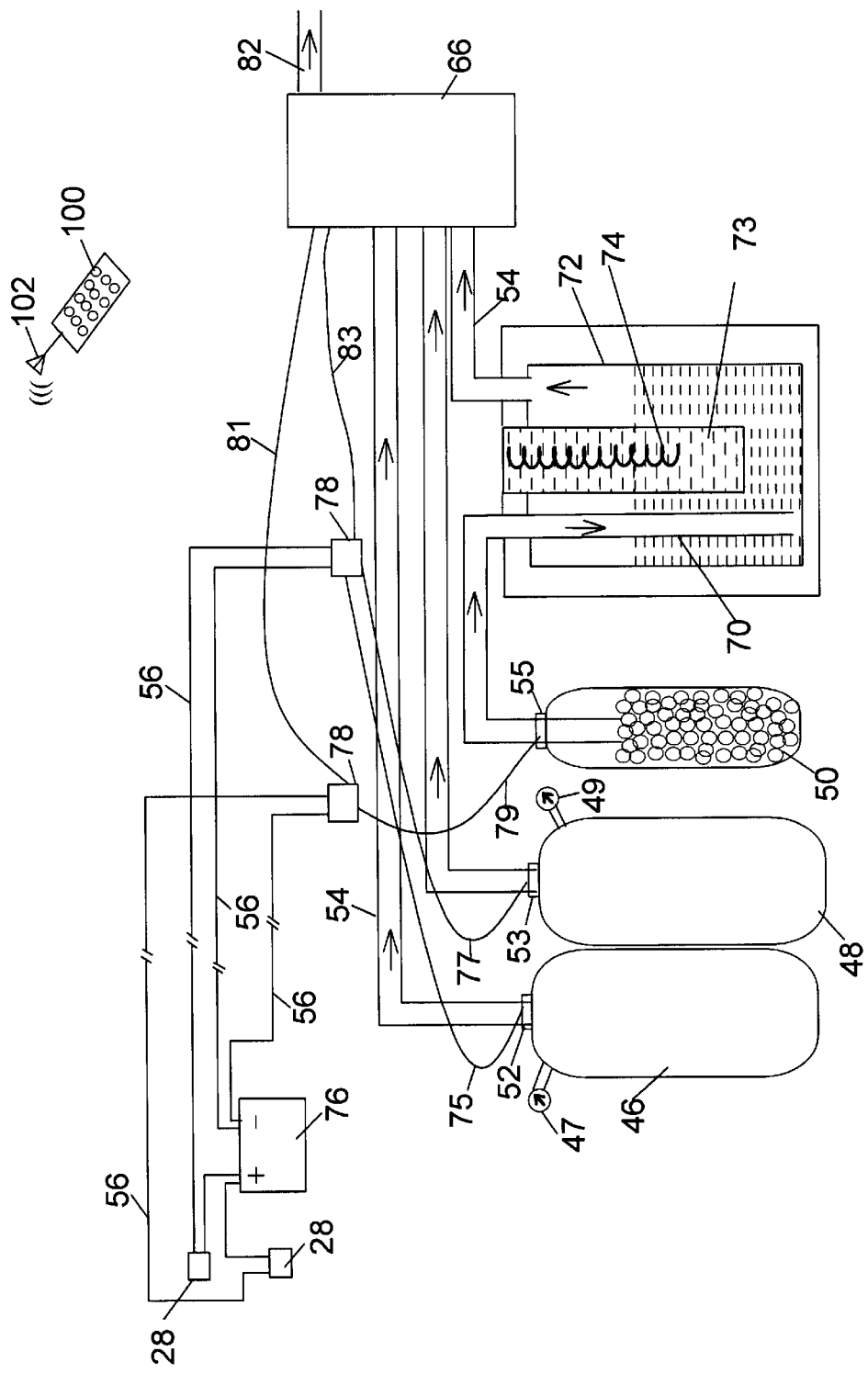
FIG. 4 is a schematic diagram showing the storage and delivery system for smoke and fog.

In one embodiment of the invention, fog can be generated outside the cockpit door (and in the cabin). As shown in FIG. 4, a first vessel 50 is kept at a first temperature and filled with an alcohol mixture. The alcohol mixture comprising approximately 50% propylene, 30% triethylene glycol, and 20% water can be used. A second vessel 72 having a heat exchanger 74 for keeping the second vessel 72 at a higher temperature than the first vessel 50. The pipe 70 connecting the two vessels has a valve 78 mounted for opening the connection between the first vessel 50 and the second vessel 72. The heating element 74 immersed in oil bath 73 can quickly generate fog, thus distributing the fog under pressure into the area behind the cockpit door, or other areas. The valve 78 can be activated from the control panel 28 in the cockpit 22, or via a wireless transmitter 100 anywhere in the plane 20. A backup battery 76 ensures continuous uninterrupted power supply.

Figure 5:
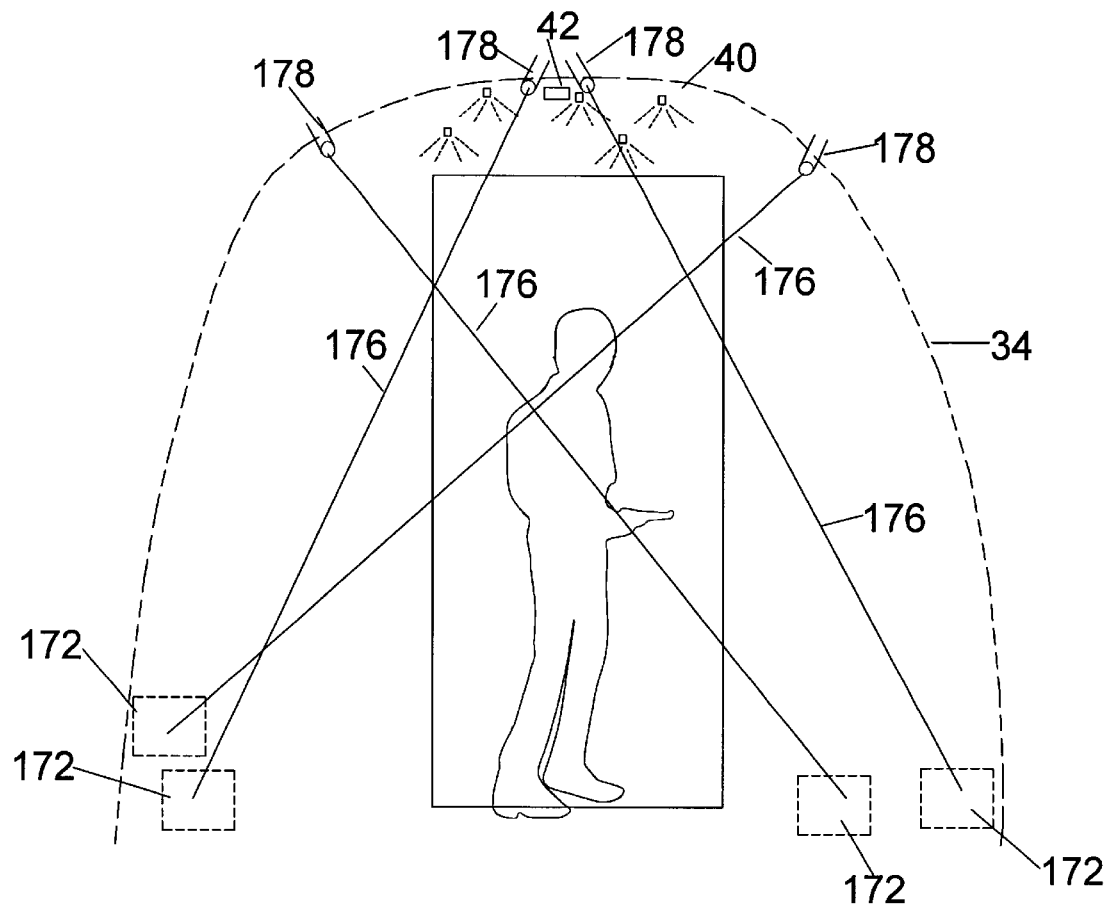
FIG. 5A is a schematic diagram showing the position of laser beams behind the cockpit door.
FIG. 5B is a schematic side-view diagram showing the position of laser beams covering the aisle area in an airplane.
FIG. 5C is a schematic top-view diagram showing the position of laser beams covering the aisle area in an airplane.
Figure 5:
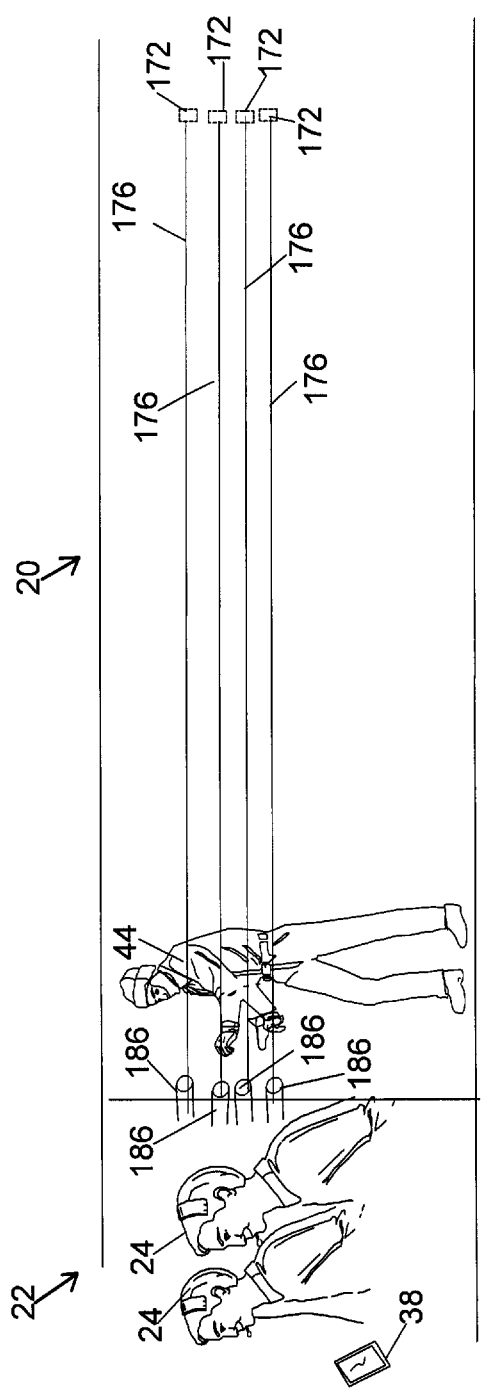
Figure 5:
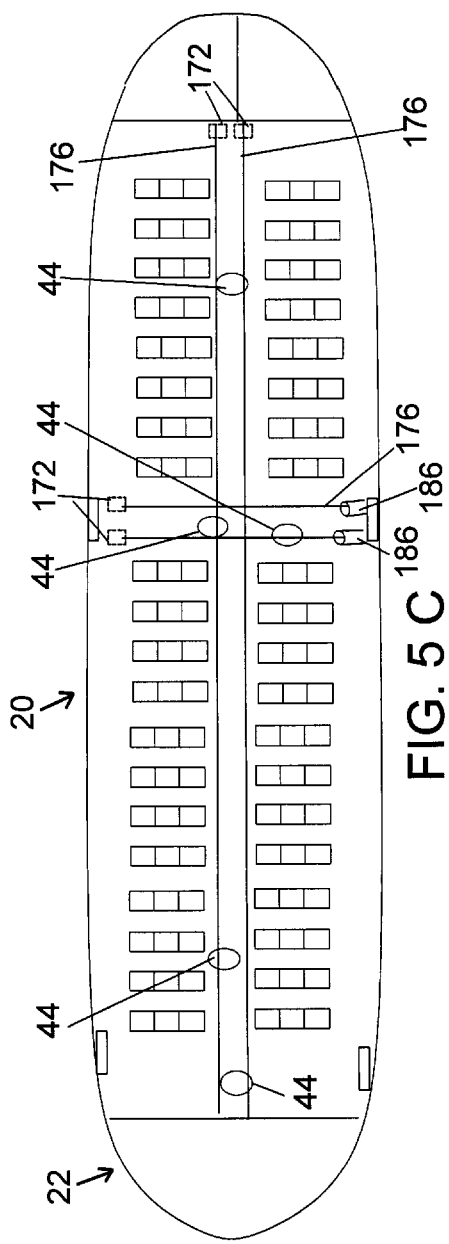

In another line of defense, laser guns are used separately, or in conjunction with chemical sprays. As shown in FIG. 5A, laser guns 178 can be strategically pointed in the area 27 behind the cockpit door. Laser guns 186 can also be pointed in the aisle, and at a level higher than the seats, as is shown in FIG. 5B. These could be used in the event that only the hijackers are standing in the aisle, and the passengers are seated. There are protective reinforced areas 172 placed in the line of the laser beam 176, to prevent damage to the airplane. Of course, the level of control and password protection would be the highest. These laser guns 178, 186 can be activated via the security control panel 28 or via wireless transmitter 100. These laser guns 178, 186 can also be used in conjunction with the above mentioned fog system or any other aerosol chemicals. The activation and use of the laser guns would be most appropriate for a plain clothes security marshal, if one is on-board during such an extreme event.

Figure 6:
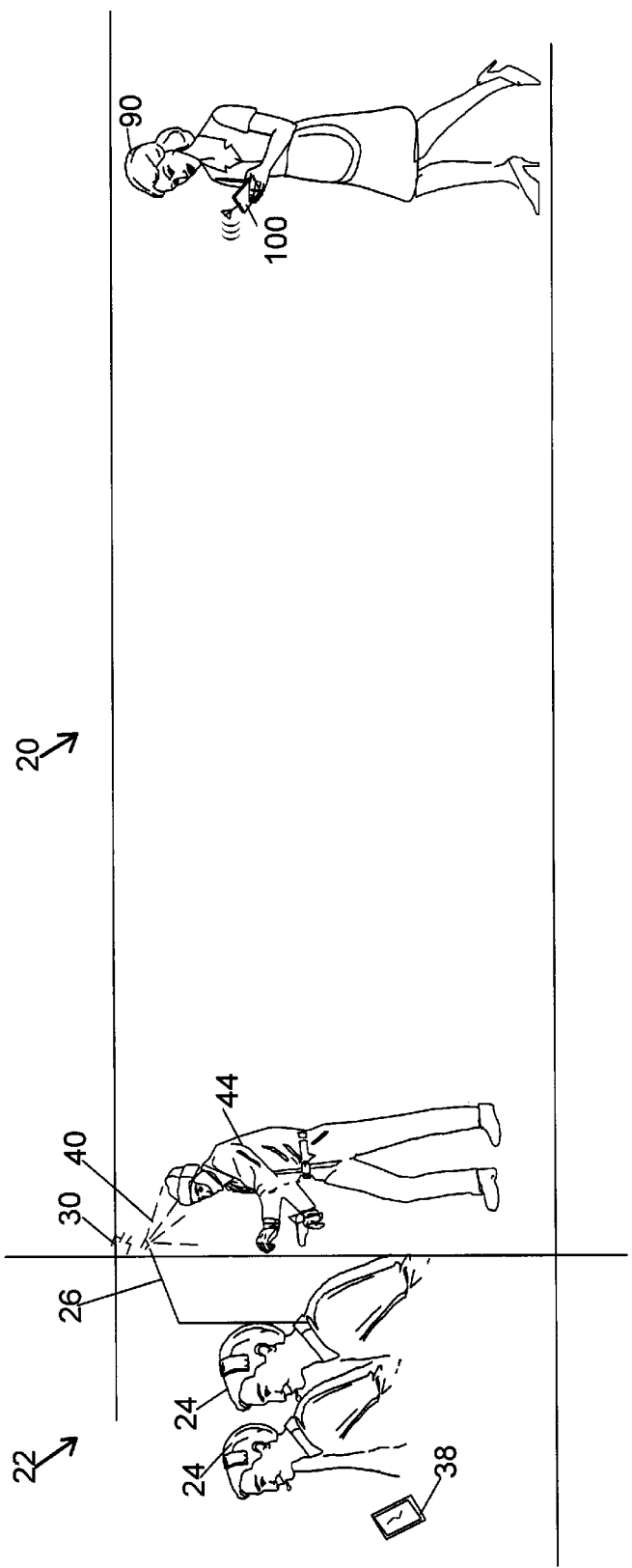
FIG. 6 is a schematic diagram showing a flight attendant carrying a wireless activation device.
Figure 7:
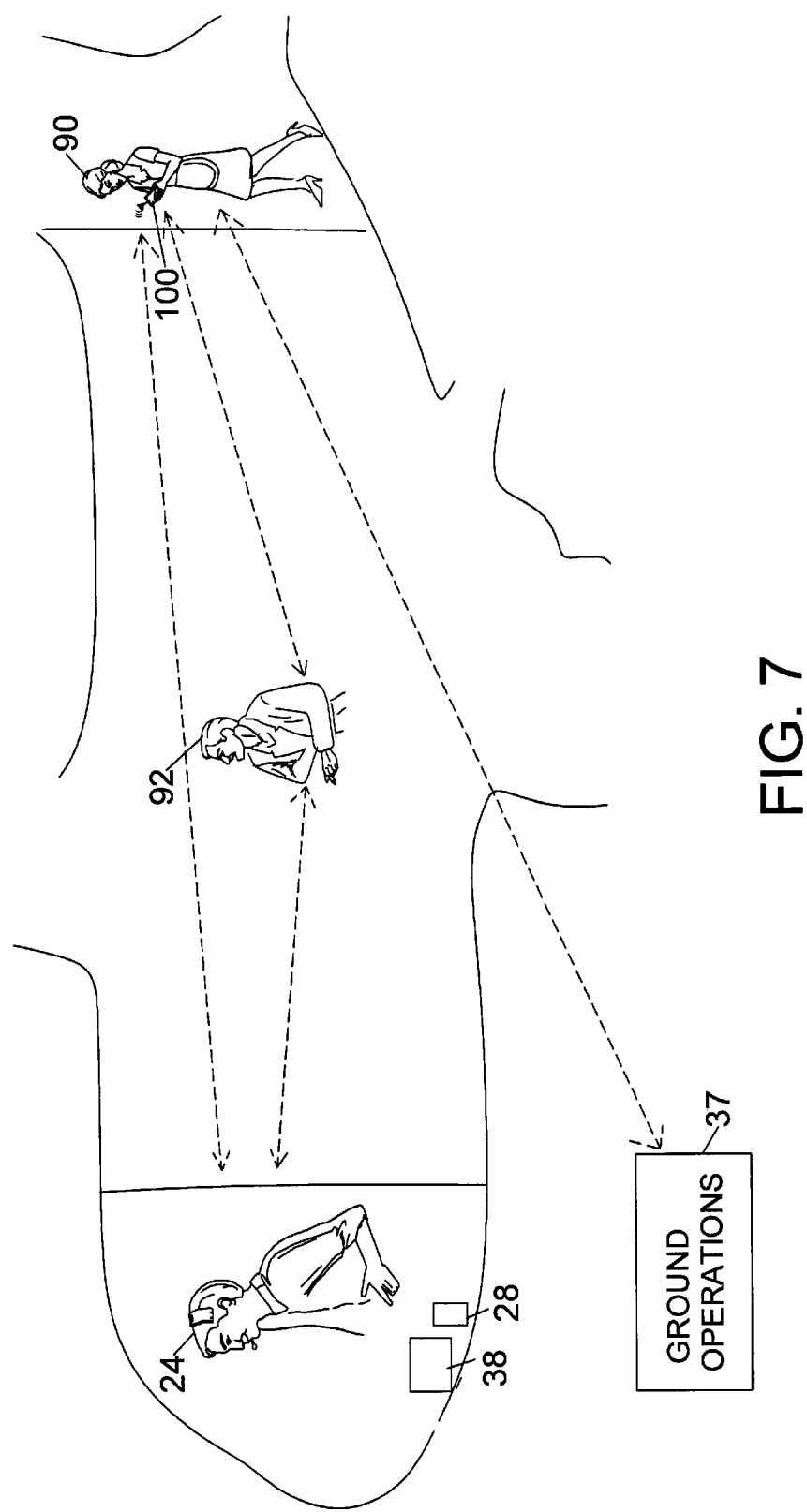
FIG. 7, is a diagram showing three-way communication with a wireless activation and communication device.

In all the above embodiments, a small wireless transmitter can also be used for activation of any modality or a combination of modalities. As shown in FIG. 6, a flight attendant is able to wirelessly either communicate with the crew in the cockpit 22, or under severe conditions is able to activate certain anti-hijacking measures. As shown in FIG. 7, a two-way or three-way communication is possible with the wireless transmitter 100. For example, as is schematically depicted, a flight attendant, through encoded messages, would simultaneously be able to alert a plain clothes air marshal 92 (if one is present), pilot 24, and ground operations 37 in the event of a hijacking or a security threat.

Figure 8:
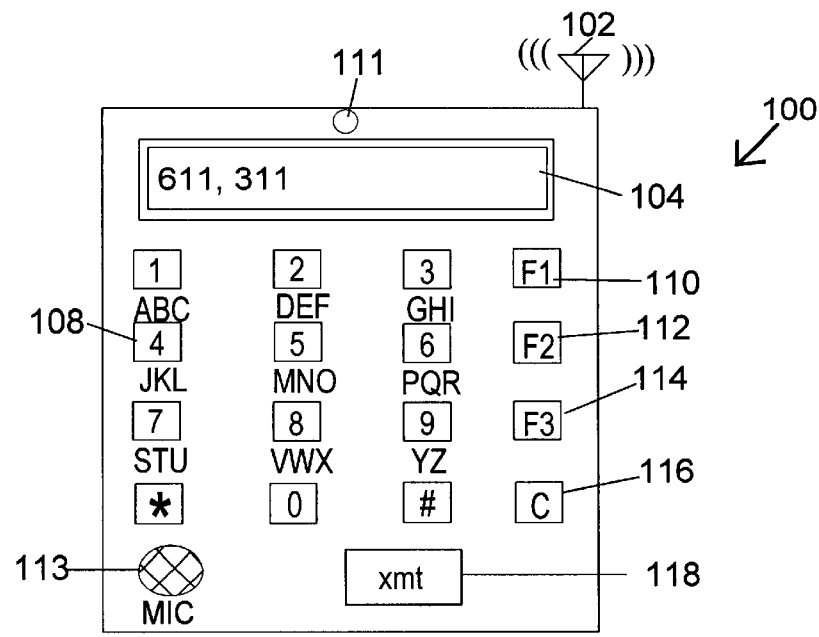
FIG. 8 is a schematic diagram showing close-up of wireless activation transmitter.

A diagram of the wireless activation system is shown in FIG. 8. The wireless transmitter 100 which looks like a tiny calculator in appearance, is a customized, sophisticated communication and remote activation system. Because of its small size, it can easily be concealed in a clothing pocket or in a handbag. The microprocessor based circuitry of the transmitter is adapted such that encoded messages activate appropriate responses. For example, by pressing a predetermined sequence of numbers an appropriate response is activated.

As one example by pressing a predetermined sequence of numbers, a message is activated at the control tower and ground operation that a serious situation (such as hijacking) is in progress. As another example, by pressing another predetermined sequence of numbers, a message is activated to the crew in the cockpit that a serious situation (such as hijacking) is in progress. As another example by pressing another predetermined sequence of numbers, a sound alarm system can be activated much like a burglar alarm system in a car. The purpose of such a sound message or alarm would be to startle the hijackers or make their communication process more difficult. The length of the audio message or alarm can be pre-programmed to any length or loudness. Other security systems, such as chemical sprays and laser guns, can also be operated from the wireless transmitter 100, with appropriate lockouts.

The presently preferred embodiment, as shown in FIG. 8, has a small liquid crystal display (LCD) screen, where the encoded messages appear. An example of an encoded message may be 811 or 611, 211, 311. Upon pressing the transmit (XMT) 118 key, an action or a series of actions are securely and reliably activated. The combination of regular keys 108, and several special function keys 110, 112, 114, 116, are used for encoding messages and activation sequences.

Figure 9:
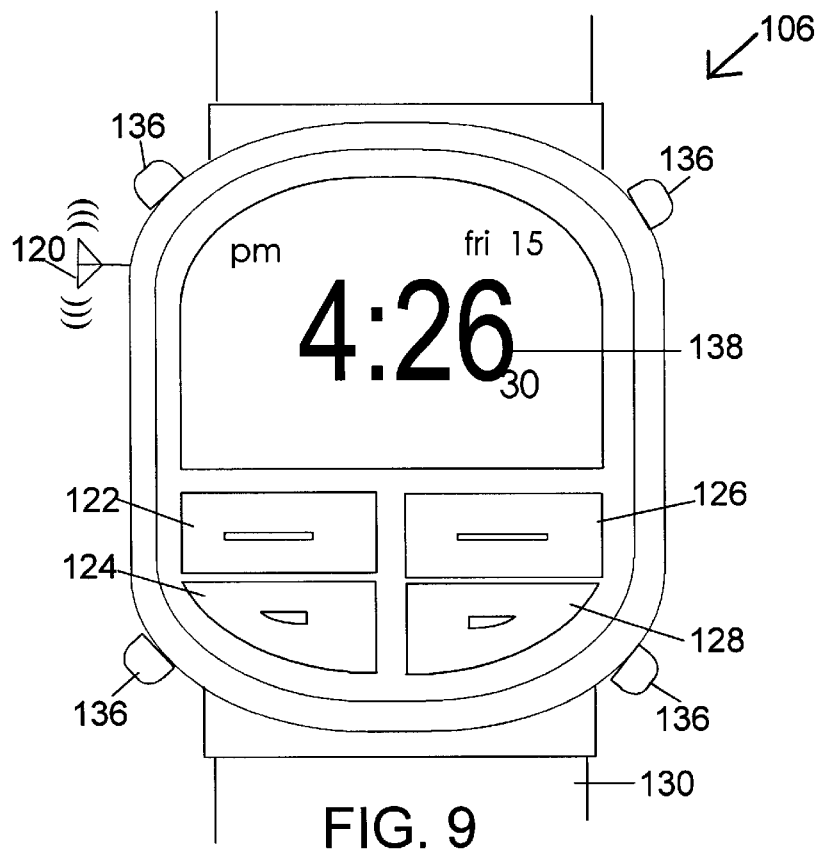
FIG. 9 is diagram showing wireless transmitter incorporated within a wristwatch.

The wireless capability and functionality of the transmitter 100 is also incorporated into a watch-size transmitter 106, as shown in FIG. 9. A series of buttons located on the front and sides of the "watch" 106 are used for encoding the activation of various systems and events.

Figure 10:
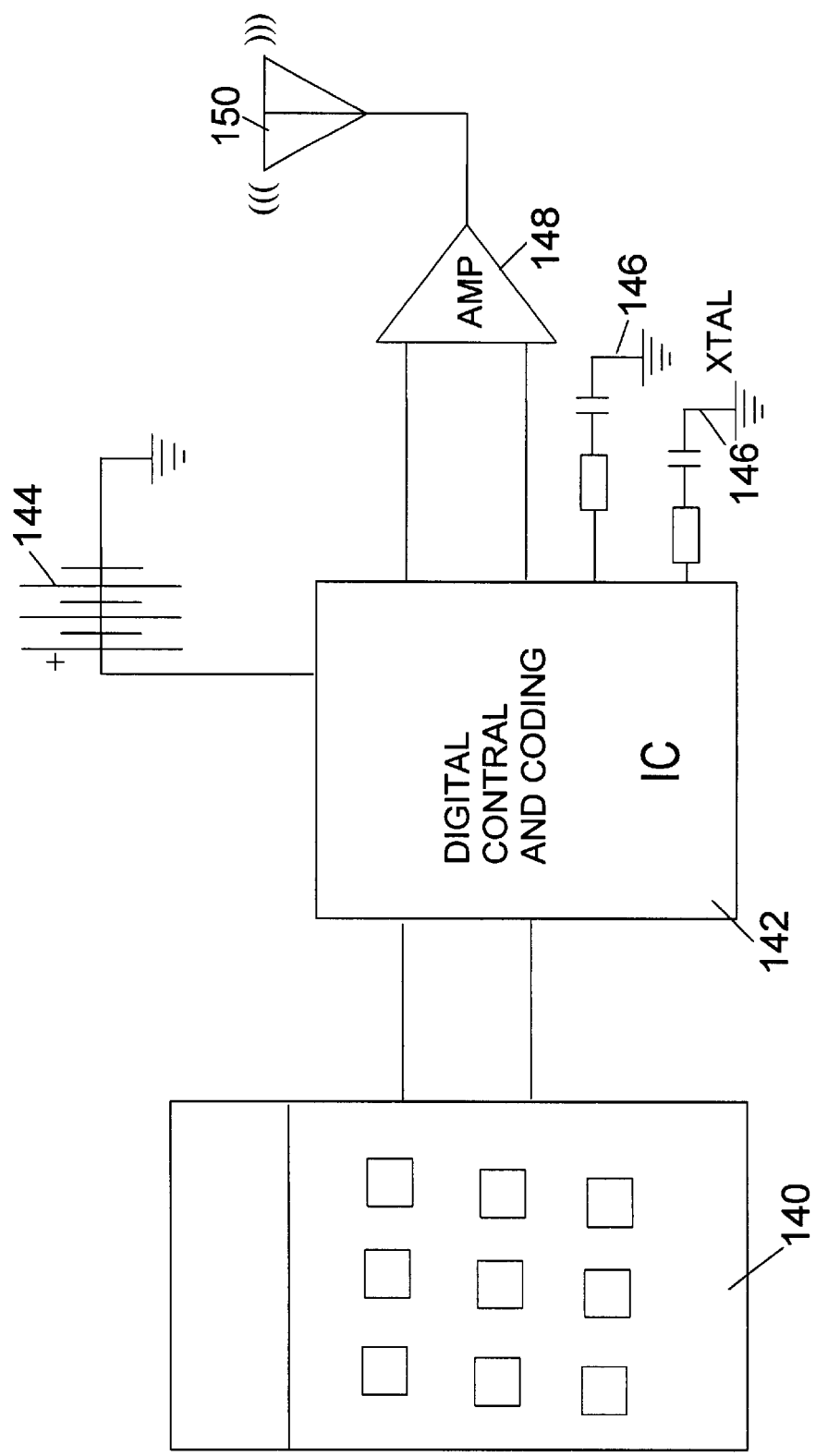
FIG. 10 is a general schematic block diagram of the wireless transmitter.

A simplified schematic diagram of the wireless transmitter 100 is shown in FIG. 10. Input to the control circuitry 142 is provided by a keypad 140. The output is coded high frequency signals, which are amplified 148, and transmitted via a small antenna 150. Clock signals are provided by crystal oscillator 146 and power to all components is provided by a battery 144.

Figure 11:
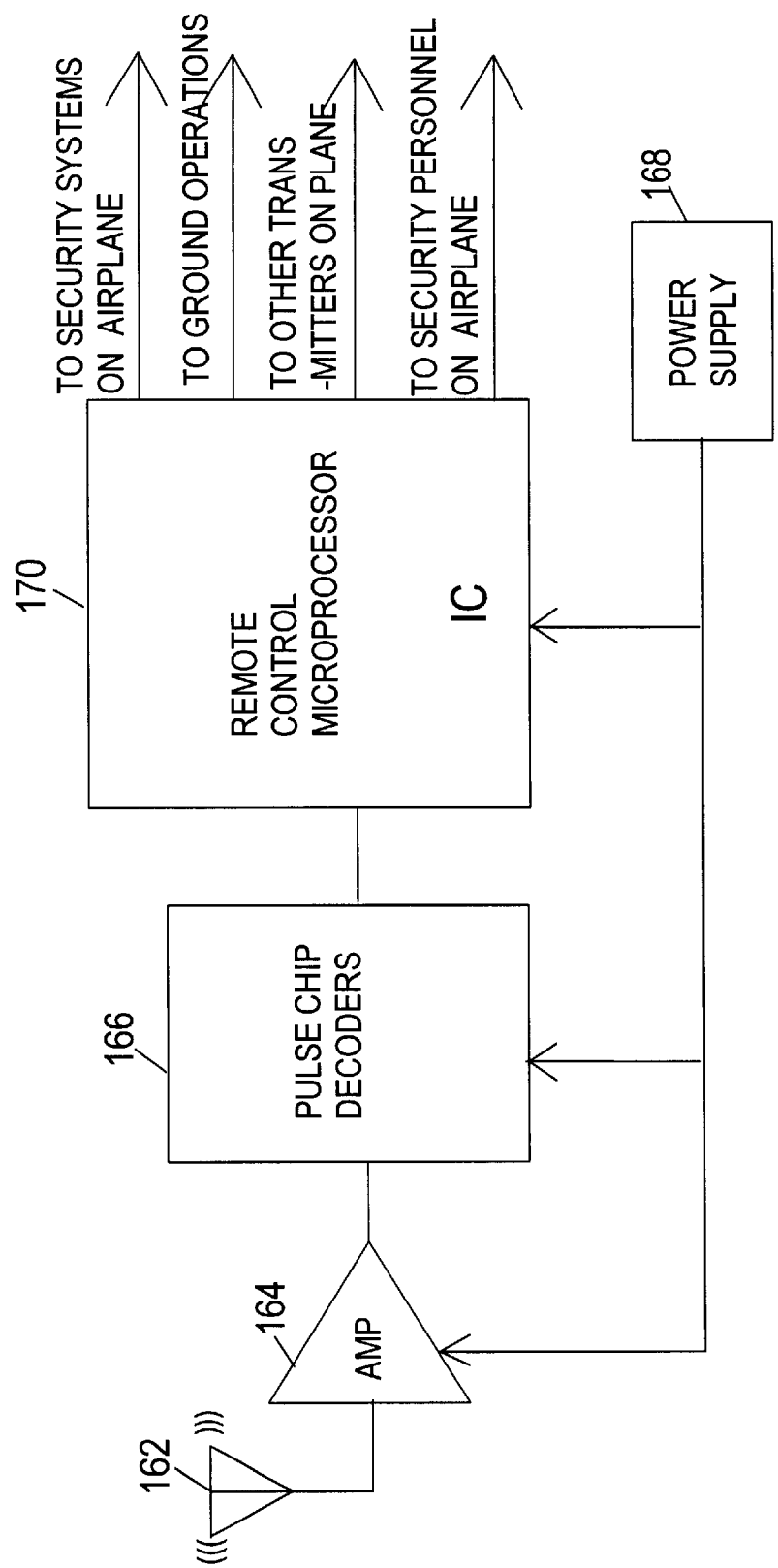
FIG. 11 is a general schematic block diagram of the wireless receiver.

As shown in FIG. 11, an antenna 162 on the receiver side receives these encoded radiofrequency pulses, which are amplified 164 and decoded 166. The main receiver and circuitry being located at the control panel 28 in the cockpit. Microprocessor circuitry 170 deciphers and routes the action of the pulses. For example, a higher level encoded security message would automatically be transmitted from the control panel 28 of the airplane to ground operations 37, and simultaneously any other additional measures would also be activated.

The activation transmitter is password and code protected with software lockouts. For example a security marshal on the plane will have access to turn on laser guns, whereas a flight attendant will have a more limited access to security defense systems Although certain preferred embodiments and methods have been disclosed herein, it will be apparent from the foregoing disclosure to those skilled in the art that variations and modifications of such embodiments and methods may be made without departing from the true spirit and scope of the invention. Accordingly, it is intended that the invention shall be limited only to the extent required by the appended claims and the rules and principles of applicable law.

We claim:

1. A system for countering hijacking attempts, hostile activity of one or more perpetrators aboard an aircraft by equipping said aircraft with defense measures comprising:
    a) means for storing and releasing gases in the passenger cabin of said aircraft, and adapted to be fitted on said aircraft, wherein said gases comprise at least one of from a group of inhalants, and general anesthetics;
    b) means for storing and releasing chemical sprays in the passenger cabin of said aircraft, and adapted to be fitted on said aircraft, and wherein said chemical sprays, comprise at least one of from a group consisting of fogging agents, sticky glue and irritants;
    c) means for sound alarms adapted to be loud enough to disrupt communications of said perpetrators; and
    d) means for activating at least one of said defense measures from cockpit, or from said passenger cabin with wireless remote device means using password protection.

2. The system of claim 1, wherein said measures may be installed on aircrafts already in operation.

3. The system of claim 1, wherein said measures may be incorporated into new aircrafts.

4. The system of claim 1, wherein said spraying action level is controlled by a wireless remote device.

5. The system of claim 4, wherein said wireless remote device is capable of three way communication between cockpit, passenger cabin crew, and ground.

6. The system of claim 1 wherein said defense measures can be selectively be activated.

7. The system of claim 1 wherein said defense measures can be simultaneously be activated.

8. The system of claim 1, wherein said spraying action is divided in sections, to selectively activate said sections.

9. The system of claim 1, further comprises viewing means to provide cabin views in said cockpit and is capable of storing images of said views.

10. A system for countering hijacking attempts, hostile activity of one or more perpetrators aboard an aircraft by equipping said aircraft with defense measures comprising:
    a) means for storing and releasing gases in the passenger cabin of said aircraft, and adapted to be fitted on said aircraft, wherein said gases comprise at least one of from a group of inhalants, and general anesthetics;
    b) means for storing and releasing chemical sprays in the passenger cabin of said aircraft, and adapted to be fitted on said aircraft, wherein said chemical sprays, comprise at least one of from a group consisting of fogging agents, sticky glue and irritants;
    c) means for laser guns adapted to be used aboard an aircraft, and located behind the cockpit door and walkways in the passenger cabin;
    d) means for sound alarms adapted to be loud enough to disrupt communications of said perpetrators; and
    e) means for activating said defense measures, from cockpit or from said passenger cabin with wireless remote device means using password protection.

11. The system of claim 10, wherein said measures may be installed on aircrafts already in operation.

12. The system of claim 10, wherein said measures may be incorporated into new aircrafts.

13. The system of claim 10, wherein said spraying action level is controlled by a wireless remote device.

14. The system of claim 13 wherein said wireless remote device is capable of three way communication between cockpit, passenger cabin, and ground.

15. The system of claim 10, wherein said defense measures can be selectively be activated.

16. The system of claim 10, wherein said defense measures can be simultaneously be activated.

17. The system of claim 10, wherein said spraying action is divided in sections, to selectively activate said sections.

18. The system of claim 10, further comprises viewing means to provide cabin views in said cockpit and is capable of storing images of said views.

19. A method of countering hijacking attempts, hostile activity of one or more perpetrators aboard an aircraft by providing on said aircraft at least two defense measures from a group comprising, i) a means to store and spray chemicals into said aircraft other than the cockpit with fogging agents, irritants, and sticky glue, ii) a means of storing and releasing gases into the passenger cabin of said aircraft, iii) a means for firing laser guns behind cockpit of said aircraft and walkways in said passenger cabin, and iv) a means for sounding alarms in said passenger cabin, comprising the steps of:
    a) deciding hostile activity is present or imminent;
    b) deciding upon which defense measures to activate; and
    c) activating said defense measures, with activating means from the cockpit or with a wireless remote device means, using password protection, from said passenger cabin.

20. The method of claim 19, wherein at least two of said defense measures can be performed simultaneously.

21. The method of claim 19, wherein at least two of said defense measures can be performed sequentially.

22. The method of claim 19, wherein said defense measures can be equipped on new aircrafts.

23. The method of claim 19, wherein said defense measures can be equipped on an aircrafts currently in use.

24. The method of claim 19, wherein said gases are selected from a group comprising inhalants, general anesthetics, and agents affecting the central nervous system.

25. The method of claim 19, wherein said spraying action is in sections, such that individual sections can be selectively activated.

26. The method of claim 19, wherein said defense measures further comprises viewing means to provide cabin views of said passenger cabin in the cockpit and store images of said views.

* * * * *